United States Patent
Wood et al.

[11] 3,715,578
[45] Feb. 6, 1973

[54] LIGHT AND FILTER ASSEMBLY FOR CEILING STRUCTURE

[75] Inventors: Walter B. Wood; Bernard R. Schuler, both of Louisville; Charles A. Bromm, Fern Creek; Wilson A. Welch, Louisville, all of Ky.

[73] Assignee: American Air Filter Company, Inc., Louisville, Ky.

[22] Filed: Feb. 10, 1971

[21] Appl. No.: 114,181

[52] U.S. Cl. ................................ 240/9 R, 98/40 DL
[51] Int. Cl. ........................................................ F21s
[58] Field of Search ............ 240/9 R, 9 A, 47, 51.11; 98/32, 33 R, 40, 40 DL; 55/350, 490, 497, 521; 52/28

[56] References Cited

UNITED STATES PATENTS

| | | | |
|---|---|---|---|
| 2,939,543 | 6/1960 | Zingone | 240/9 R X |
| 3,252,400 | 5/1966 | Madl, Jr. | 98/40 DL |
| 3,352,071 | 11/1967 | Sutter | 240/9 R X |
| 3,418,915 | 12/1968 | Marble | 98/40 DL |
| 3,486,311 | 12/1969 | Allan, Jr. | 98/32 X |
| 3,570,385 | 3/1971 | Heisterkamp | 240/47 |

*Primary Examiner*—Louis J. Capozi
*Attorney*—Ralph B. Brick

[57] ABSTRACT

A modular light and filter assembly arranged to be suspended from ceiling superstructure with the light assembly being removably supported directly below the filter assembly in an arrangement maximizing laminar flow of the gases to be treated by the filter assembly.

6 Claims, 4 Drawing Figures

PATENTED FEB 6 1973
3,715,578
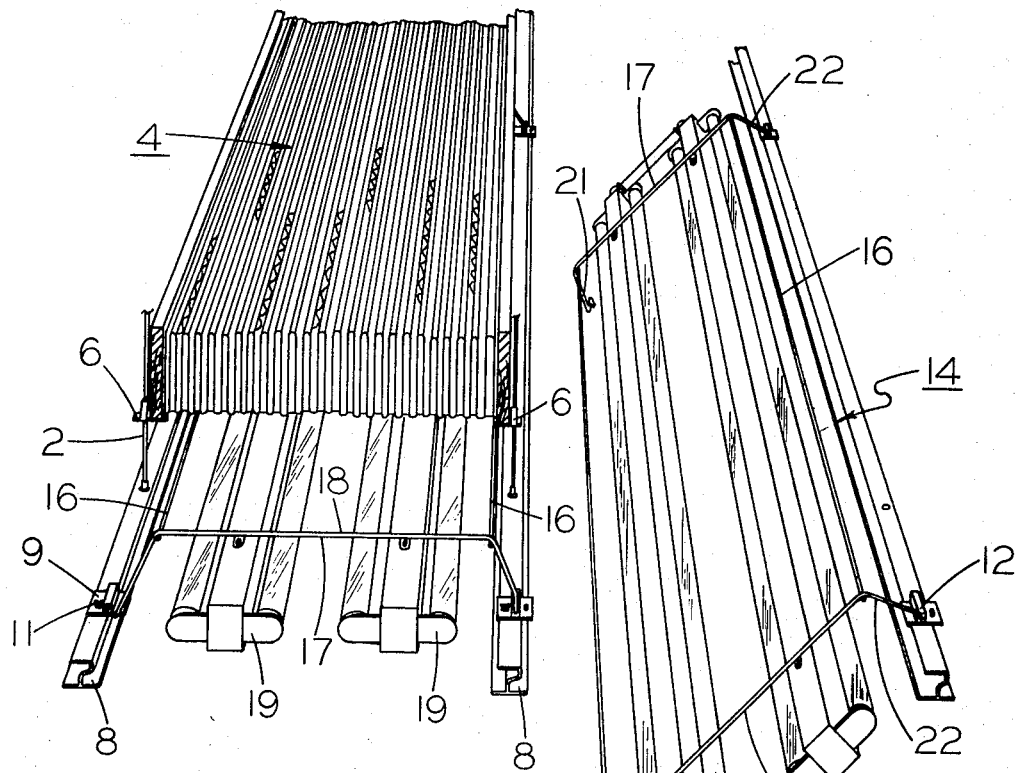
FIG. 1
FIG. 3
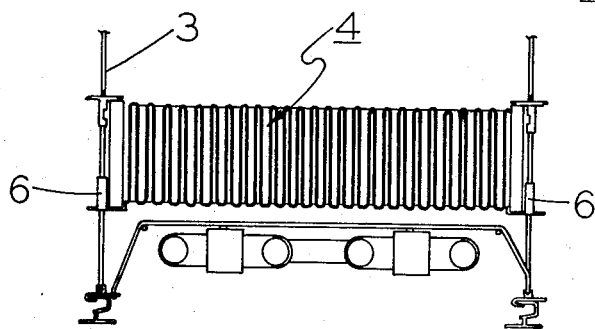
FIG. 2
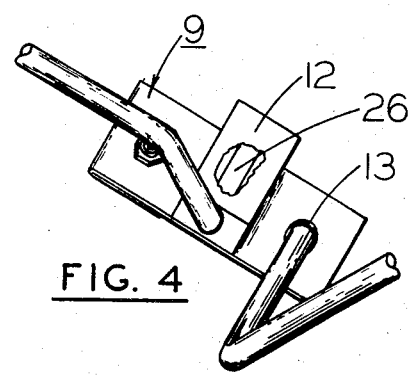
FIG. 4
*INVENTORS*
BERNARD R. SHULER
CHARLES A. BROMM
WILSON A. WELCH
WALTER B. WOOD
BY Ralph B. Buck

000
LIGHT AND FILTER ASSEMBLY FOR CEILING STRUCTURE

BACKGROUND OF THE INVENTION

The invention pertains to an improved construction for clean room structures and more particularly to a new, useful and unobvious arrangement for supporting light and filter structures in clean rooms.

Various type of arrangements have been used in the past to support filter assemblies from the ceiling of a clean room. These past assemblies have been complex in construction and erection, requiring elaborate installation arrangements with the filter assemblies being fixed to occupy one selected portion of a ceiling area and the light assemblies being spaced in fixed supported relationship therebetween.

The present invention provides a straight-forward and economical modular light and filter assembly arrangement which can be readily suspended and removed from a superstructure of a clean room ceiling for easy maintenance and for variable positioning and variable selection of the modules making up the assembly.

Various other features of the present invention will become obvious to one skilled in the art upon reading the disclosure set forth hereinafter.

More particularly, the present invention provides a modular light and filter assembly arranged to be suspended from the superstructure of a ceiling comprising: spaced suspension members connected at corresponding ends to the ceiling superstructure; a flow-through filter assembly extending between the spaced suspension members; filter support members mounted on the suspension member to support the filter assembly; a plurality of longitudinally extending light members; and light support means cooperating with the light members to support the light members in spaced flow-through position directly below the flow-through assembly.

It is to be understood that the various changes can be made by one skilled in the art in the arrangement, form and construction of the several parts of the apparatus disclosed herein without departing from the scope or spirit of the present invention.

Referring to the drawing, which discloses one advantageous embodiment of the present invention:

FIG. 1 is a front-end perspective view of the novel light and filter assembly of the present invention;

FIG. 2 is an end view of the apparatus of FIG. 1;

FIG. 3 is a perspective view of the light assembly of FIG. 1 showing the light assembly in partially pivoted position; and;

FIG. 4 is an enlarged detailed view, partially broken away, disclosing one of the keeper plates which can be slidably mounted on the support rails for adjustable mounting of the light assembly.

Referring to the drawing, spaced and aligned suspension members 2 in the form of threaded rods are disclosed (FIG. 2) as connected at corresponding ends to ceiling superstructure 3. Although only the front suspension members 22 are disclosed in the drawing, it is to be understood that at least two aligned suspension members are utilized to suspend each side of the assembly.

Flow-through filter assembly 4 is disclosed to extend between spaced suspension members 2. Filter assembly 4 can be of any one of several types known in the art of clean room design and advantageously is comprised of a box-like, rigid peripheral flow-through frame having disposed therein gas pervious filter media folded back and forth upon itself in several layers with spacers inserted therebetween to provide a maximum amount of filter media in a given selected area.

Suitable filter support members in the form of indented cantilever support arms 6 are threadably and adjustably mounted on suspension members 2 to receive the lower edge of the peripheral frame of filter assembly 4 in nesting relation with the indents, the support arms 6 being at a suitably pre-selected position below the ceiling superstructure.

Connected to the lower ends of suspension members 2 directly below filter support arms 6 is a pair of spaced support rails 8. Rails 8 are of modified I-beam type cross-section and have slidably fastened thereto, pairs of spaced keeper plates 9 (FIG. 4) which can be slidably moved along the rails in suitably spaced position relative each other. Advantageously keeper plates 9 on each of support rails 8 are of similar construction with each including a pintle housing 12 and a spaced aperture 13. It is to be understood that the similarity of keeper plate 9 permits interchangeability from one rail to another, permitting the plates to function in one of two manners. A suitable winged set screw 11 is mounted on plate 9 to hold the plate in fast position at a pre-selected location on its rail 8.

Arranged to be supported between parallel rails 8 directly below filter assembly 4 is a cradle 14. Cradle 14 is comprised of a rectangular frame of opposed pairs of spaced parallel rods, one pair of rods 16 extending parallel to the rails and the other pair 17 extending transversely between the spaced rails. It is to be noted that each rod 17 is of U-shaped configuration, so that rods 17 provide spaced base portions 18 to which light members 19 are mounted in longitudinally extending spaced flow-through relationship between rails 8 and below filter assembly 4. Base portions 18 have opposed leg portions 21 and 22 extending therefrom to provide spaced corresponding leg portion pairs with one corresponding leg portion pair 22 being connected for pivotal movement about one of the support rails and the other corresponding leg portion pair 21 being releasably connected to the other of the support rails.

To accomplish the pivotal and releasable movement it is to be noted that corresponding leg portion pair 21 is offset as at 23. The offset or bolt portion 23 being engageable in a hole 13 of keeper plate 9 with the portion 24 resting on the top surface of the keeper plate. The other corresponding leg portion pair 22 is turned at right angles with the extremity 26 of the right angle turn serving as a pintle to engage in pintle housing 12 of keeper plate 9. It is to be noted that light members 19 mounted to base portions 18 are spaced in equal distance fashion directly below the filter assembly 4 to maximize laminar flow of the gases treated by filter assembly 4.

With the above described arrangement it is possible to readily pivot light cradle 14 into and out of position for installation and removal of the lights and the filter assembly. It is further possible to position cradle 14 in pre-selected locations along the rails. In addition, it is possible to use the keeper plates provided with both a pintle housing 12 and an aperture 13 in such a manner as to readily accommodate side by side cradles 14. Further, it is possible to readily adjust the relationship in spacing between the filter assembly 4 and the light cradle 14, as well as between the filter assembly 4 and the ceiling superstructure 3 to insure maximized laminar flow and to optimize maximum filtration efficiency with appropriate lighting in the clean room. Further, it can be readily seen that the aforedescribed arrangement is economical and straightforward, minimizing the space required for the overall structure.

The invention claimed is:

1. A modular light and filter assembly arranged to be suspended from the superstructure of a ceiling comprising: spaced suspension members connected at corresponding ends to said ceiling superstructure; a flow-through filter assembly extending between said spaced suspension members; filter support members mounted on said suspension members to support said filter assembly; a plurality of longitudinally extending light members; and light support means including a pair of spaced support rails below said filter support members and a cradle extending between said support rails to which said light members are mounted in spaced flow-through position directly below said flow-through filter assembly.

2. The apparatus of claim 1, said light members being spaced equidistant between said filter assembly to maximize laminar flow of the gases treated by said filter assembly.

3. The apparatus of claim 1, said cradle comprising a rectangular frame of opposed pairs of spaced parallel rods, one pair of said rods extending parallel to said rails and the other pair extending transversely between said spaced rails with each rod of said transverse pair being of U-shaped configuration to provide spaced base portions to which said light members are mounted in longitudinally extending spaced flow-through relation, said base portions having opposed leg portions extending therefrom to provide spaced corresponding leg portion pairs with one corresponding leg portion pair being connected for pivotal movement about one of said support rails and the other corresponding leg portion pair being releasably connected to the other of said support rails.

4. The apparatus of claim 3 and pairs of keeper plates slidably mounted on each of said support rails to receive said corresponding leg portion pairs to position said leg portion pairs at preselected locations along said rails.

5. The apparatus of claim 4, one of said corresponding leg portion pairs being offset at its extremities, said keeper plates cooperating therewith having apertures disposed therein to engagingly receive said offset, the other of said corresponding leg portion pairs being turned at its extremities to provide pintles, said keeper plates cooperating therewith having pintle housings to engagingly receive said pintles.

6. The apparatus of claim 5, said keeper plates having both apertures and pintle housings disposed therein to be interchangeable.

* * * * *